June 25, 1957 — A. G. BODINE, JR — 2,796,735
ACOUSTIC JET ENGINE WITH FLOW DEFLECTION FLUID
PUMPING CHARACTERISTICS
Original Filed April 24, 1950 — 6 Sheets-Sheet 1
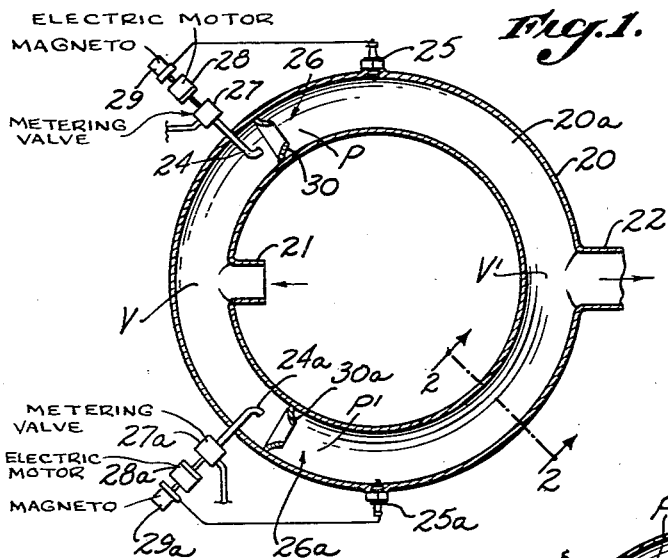
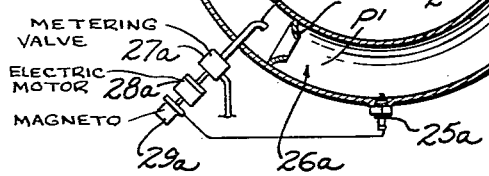
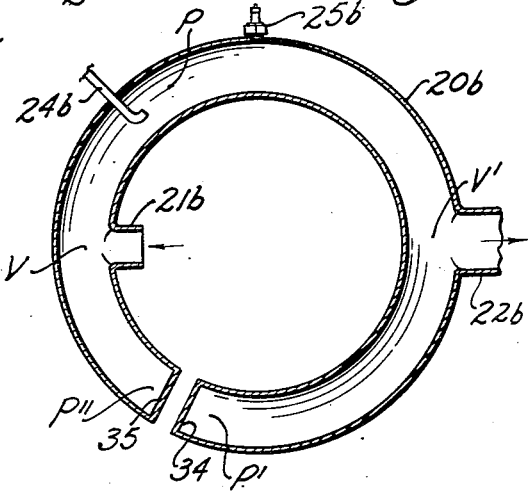
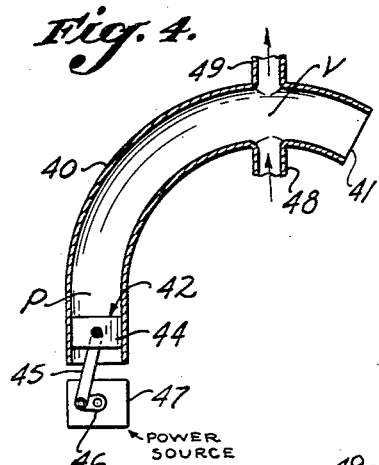
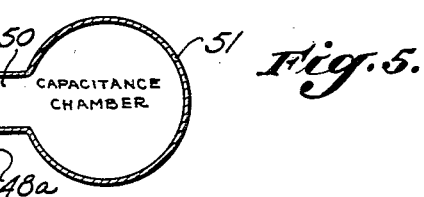
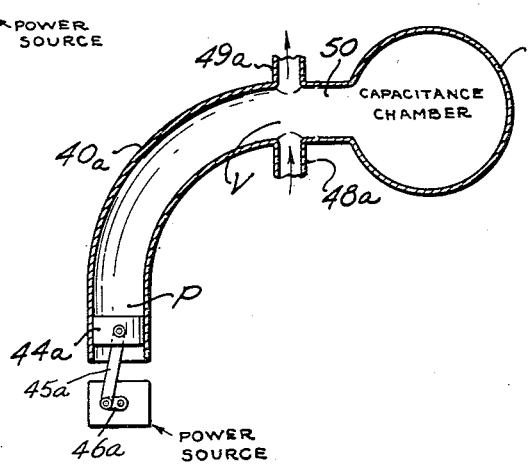
INVENTOR.
ALBERT G. BODINE JR.
BY
ATTORNEY

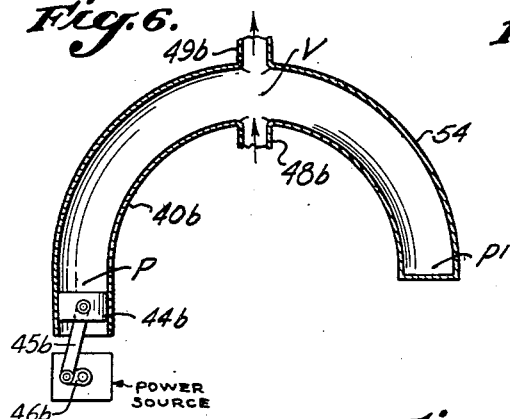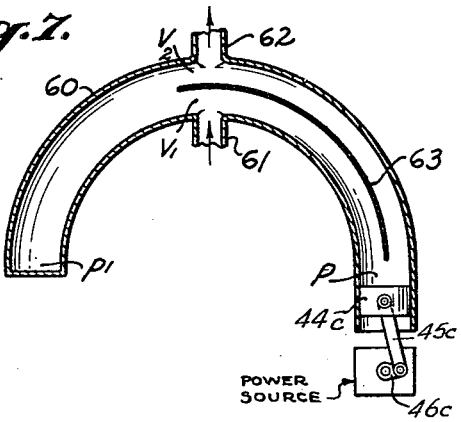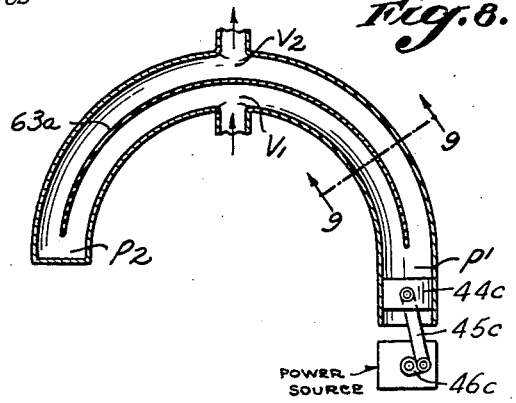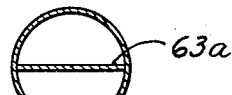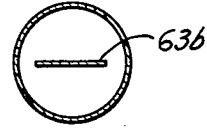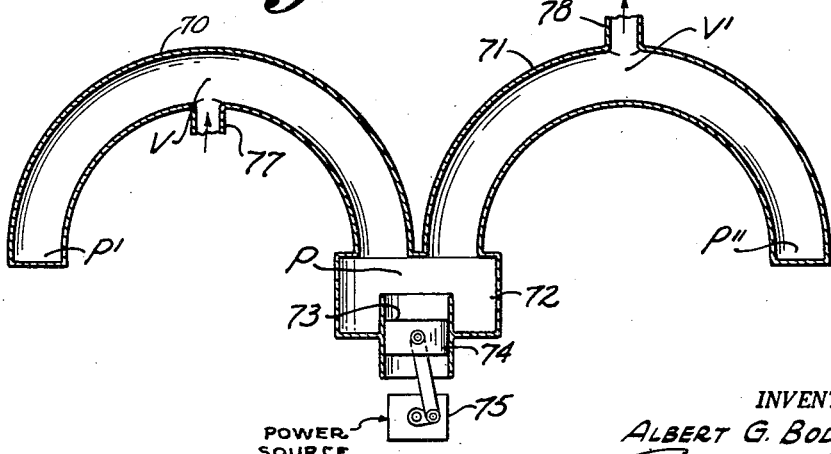

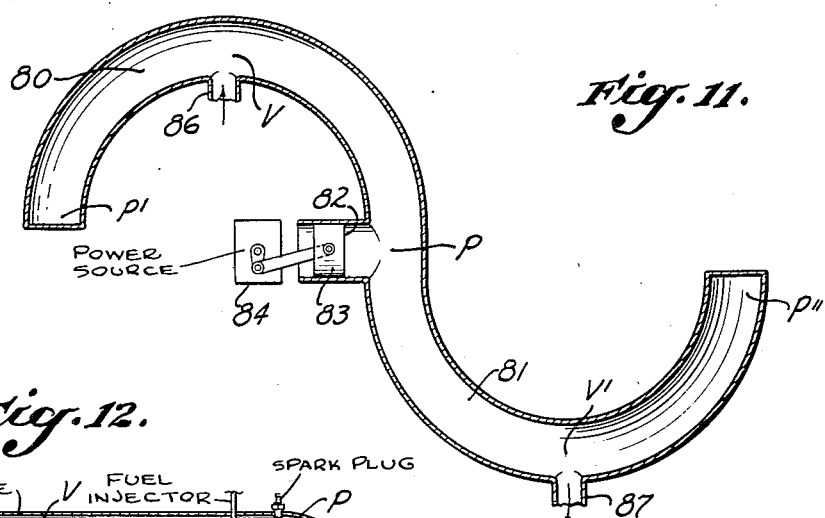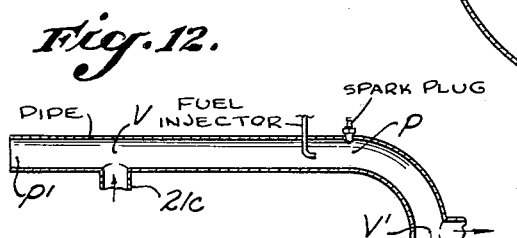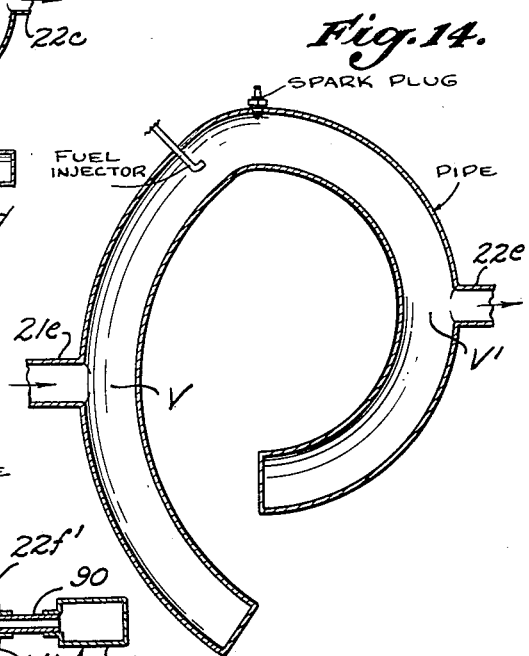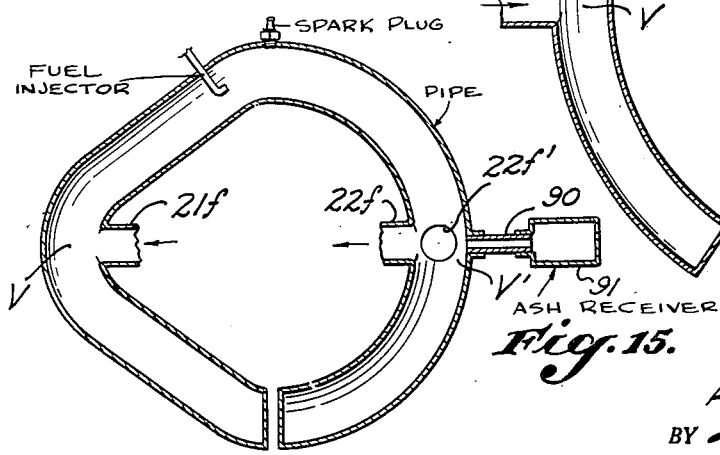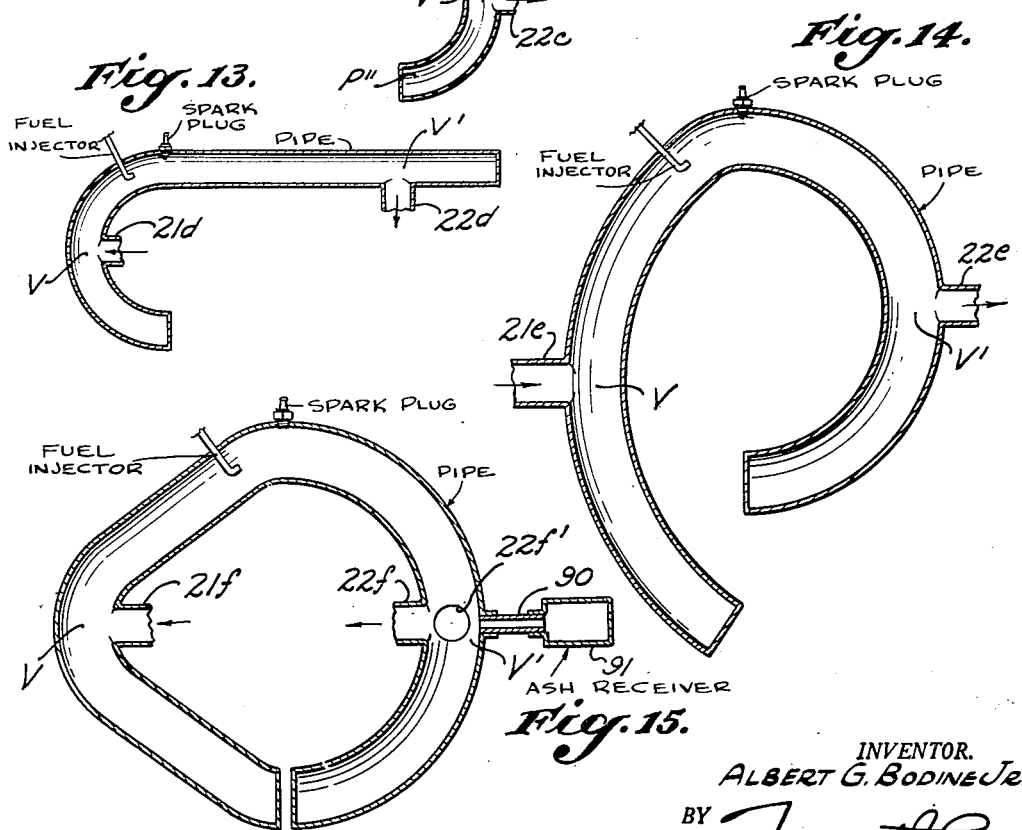

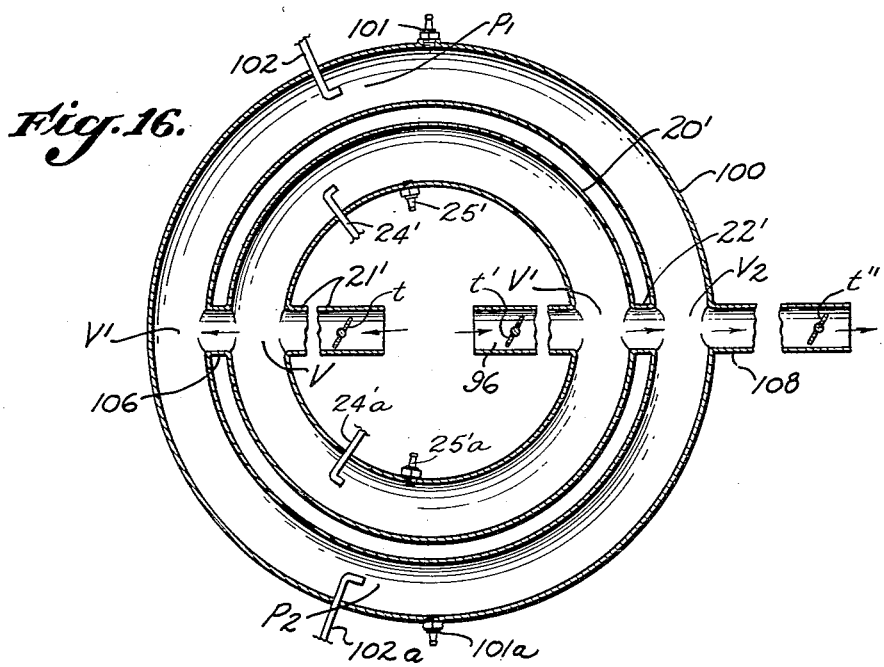
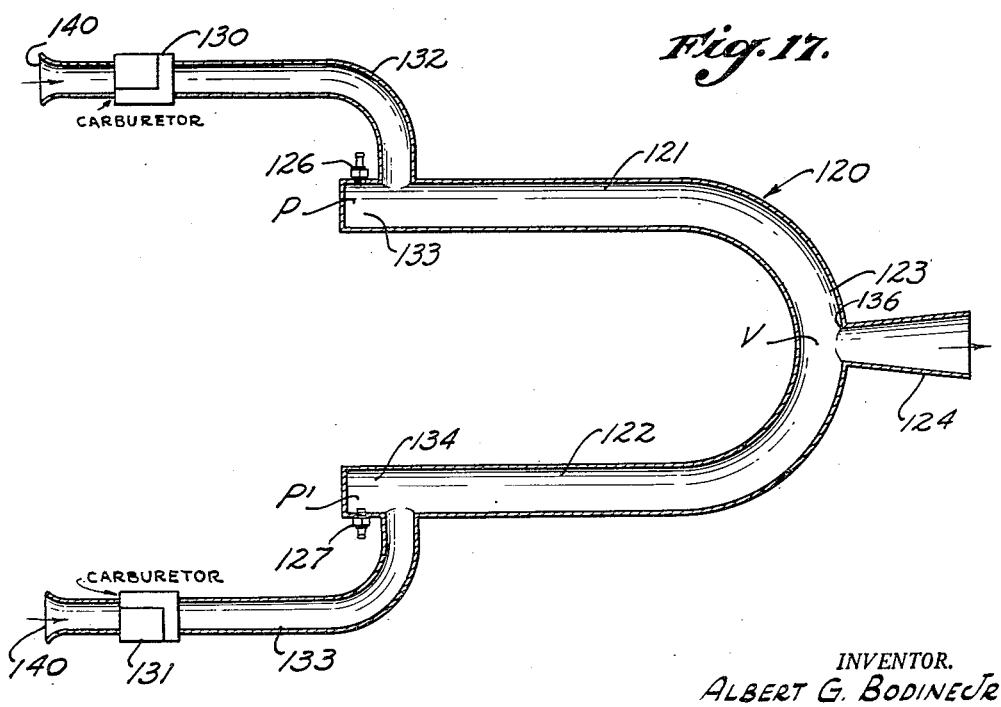

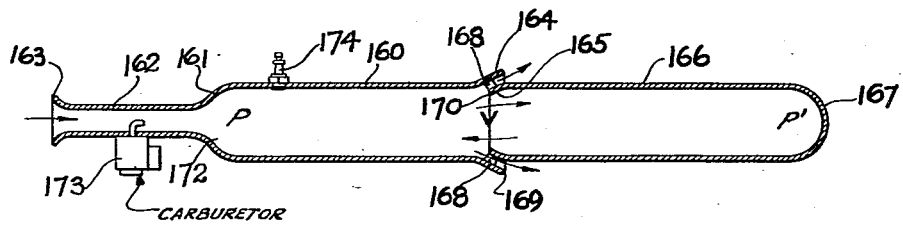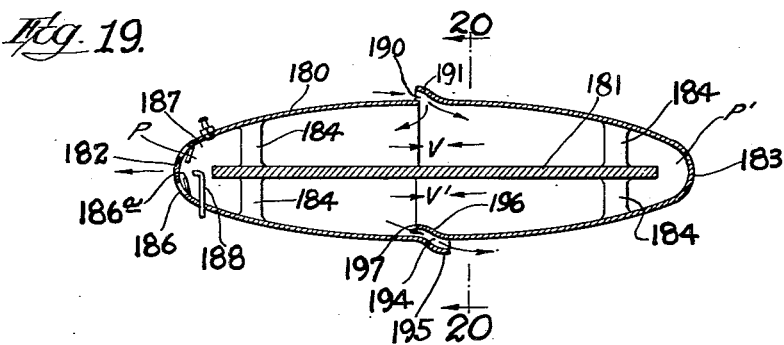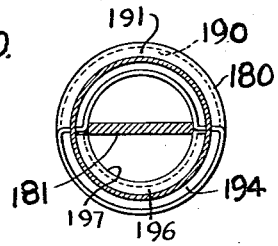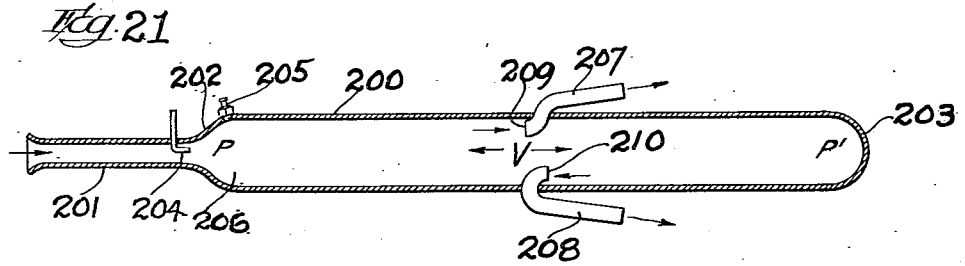

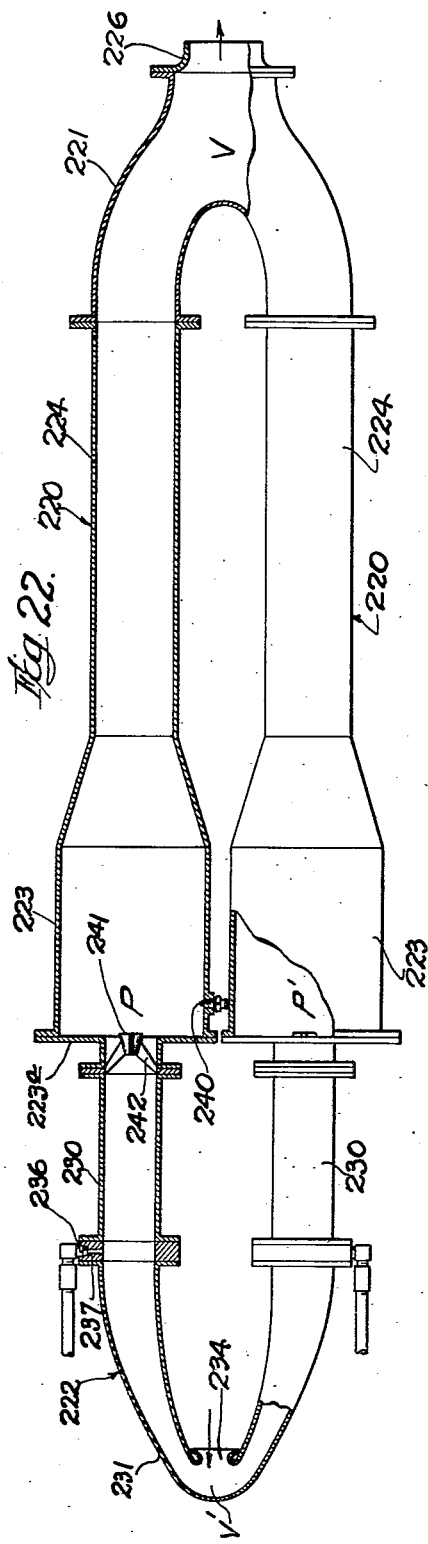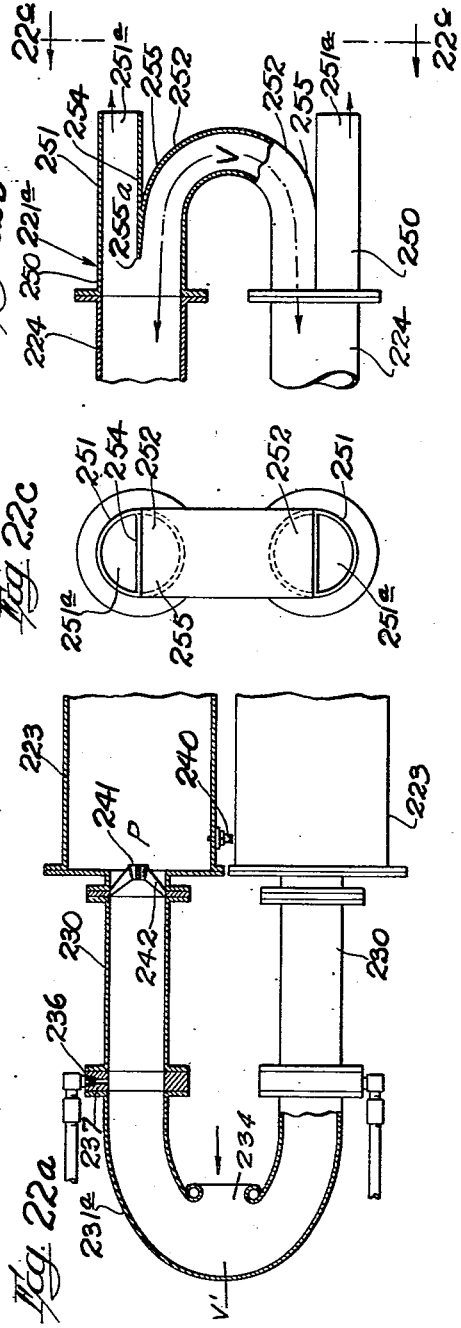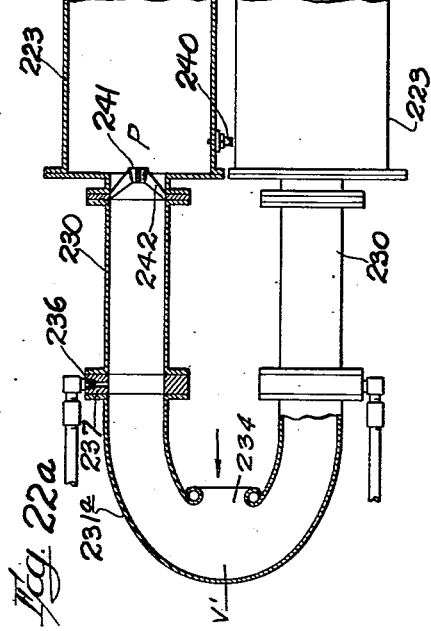

United States Patent Office 2,796,735
Patented June 25, 1957

2,796,735

ACOUSTIC JET ENGINE WITH FLOW DEFLECTION FLUID PUMPING CHARACTERISTICS

Albert G. Bodine, Jr., Van Nuys, Calif.

Continuation of abandoned applications Serial No. 157,740, April 24, 1950, and Serial No. 555,816, December 27, 1955. This application August 20, 1956, Serial No. 605,069

19 Claims. (Cl. 60—39.77)

This invention relates generally to acoustic pulse jet engines, illustratively of the type broadly disclosed in my United States Patent No. 2,480,626, issued August 30, 1949. This application is a continuation of, substitute for and consolidation of my co-pending applications entitled Acoustic Jet Engine With Centrifugal Fluid Pumping Characteristics, filed April 24, 1950, Ser. No. 157,740 (now abandoned), and Acoustic Jet Engine With Flow Deflection Fluid Pumping Characteristics, filed December 27, 1955, Ser. No. 555,816 (now abandoned) and is a continuation-in-part of my earlier application entitled Multi-Circuit Quarter Wave Pulse Jet Engine, filed January 12, 1948, Ser. No. 1,733, now Patent No. 2,546,966, issued April 3, 1951, connected with the present application by co-pendency through said application Ser. No. 157,740.

Many acoustic pulse jet engines, such as most of those shown in my said Patent Number 2,480,626, require engine operated check valves in order to pump their own combustion air. The valveless forms of my acoustic jet engine usually require a blower of ram air as a source of combustion air. Valves are of course a source of aerodynamic loss, as well as a cause of frequent mechanical failure. Also, the necessity of using either auxiliary blowers or ram air is an undesirable restriction.

The general object of the present invention is accordingly the provision of a valveless acoustic pulse jet engine which pumps or assists pumping of its own combustion air.

An acoustic pulse jet engine of the general character to which the present invention appertains comprises a resonant acoustic conduit, with fluid inlet and fluid outlet ports (both preferably and usually valveless), together with a sound wave generator means located in the conduit and operable at a resonant frequency thereof to establish a resonant sound wave in the gas body or column in the latter. A velocity anti-node of the standing wave, i. e., a region of maximized gas particle oscillation velocity, appears in the region of each valveless port, and a pressure anti-node, i. e., a region of maximized gas pressure oscillation amplitude, appears at the sound wave generator means. A large amount of energy exists in the resonant standing wave in the gas column in the resonant acoustic type engine, being in the form of potential energy at the pressure anti-nodes, alternating twice each cycle with kinetic energy at the velocity anti-nodes. At the high sonic wave frequency dictated by the natural resonant frequency of the typical engine, e. g., of the order of 40–400 cycles per second, the kinetic energy of the gas at the velocity anti-nodes is of considerable magnitude and significance. Gas particle acceleration under these conditions is extremely high, as is maximum velocity amplitude. The velocity anti-nodes are thus seats of high, maximized kinetic energy, which are drawn upon in the carrying out of the invention. With the foregoing in mind, a principal salient feature of the invention in the preferred form thereof is the incorporation of a gas flow path defining means in the conduit in the velocity anti-node regions, where the seats of maximized sonic standing wave kinetic energy reside, and at which the air intake and gas discharge ports have been located, such gas flow path defining means so coacting with the oscillating gas flow that there are produced high gas deflecting or flow inducing force components directed angularly of the normal path of free gas oscillation within the velocity anti-node region of the conduit, viz., inwardly of the air intake port, and outwardly of the gas discharge port, under motivation by the velocity anti-nodes seats of sonic kinetic energy. These force components acting on the gas particles create pressure gradients within the gas in the conduit, both across the gas column in the velocity anti-node regions, and between the inflow and outflow ports, causing a net fluid flow through the ports and the intervening conduit in response thereto. It will be seen that the flow path defining means at the inlet and outlet ports must be differently constructed and arranged relative to the direction of fluid flow in the conduit thereadjacent, so that the effects of the two will not cancel one another. Both must aid the desired net fluid flow, or at the minimum, one must aid, and the other not cancel the first. With this innovation, intake and discharge valves, auxiliary blowers, and provision for ram air, become subject to complete elimination. It may here be explained that when I refer to valveless fluid intake and fluid discharge, I have reference to the usual engine operated check valves, either mechanically or differential pressure operated, to be opened and closed at high frequency, and not to mere throttle valves, which may in some cases be used to advantage in my engine to adjust or regulate the sizes of the intake and discharge orifices.

The engine of the present invention has many uses and forms, including, among others, jet propulsion for aircraft, marine propulsion (using water as the fluid medium in the system), as a blower or compressor, and as a burner to generate heat, power or fluid pressure by combustion of a fuel.

The invention will be better understood from the following detailed description of various illustrative embodiments thereof, reference for this purpose being had to the accompanying drawings, in which:

Figure 1 is a diagrammatic view showing an illustrative form of the invention;

Figure 2 is a cross-sectional view on line 2—2 of Figure 1;

Figure 3 is a diagrammatic view showing a modification of the invention;

Figure 4 is a diagrammatic view showing another modification of the invention;

Figure 5 is a diagrammatic view showing another modification of the invention;

Figure 6 is a diagrammatic view showing another modification of the invention;

Figure 7 is a diagrammatic view showing another modification of the invention;

Figure 8 is a diagrammatic view showing another modification of the invention;

Figure 9 is a section on line 9—9 of Figure 8;

Figure 9a is a section similar to Figure 9 but showing a modification;

Figure 10 is a diagrammatic view showing another modified form of the invention;

Figure 11 is a diagrammatic view showing another modified form of the invention;

Figure 12 is a diagrammatic view showing another modified form of the invention;

Figure 13 is a diagrammatic view showing another modified form of the invention;

Figure 14 is a diagrammatic view showing another modified form of the invention;

Figure 15 is a diagrammatic view showing another modified form of the invention;

Figure 16 is a diagrammatic view showing another modified form of the invention;

Figure 17 is a diagrammatic view showing another modified form of the invention;

Fig. 18 is a longitudinal sectional view through a jet engine in accordance with the invention;

Fig. 19 is a longitudinal sectional view through another embodiment of the invention;

Figure 20 is a transverse section taken on line 20—20 of Figure 19;

Figure 21 is a longitudinal sectional view through another jet engine in accordance with the invention;

Figure 22 is partly in longitudinal section and partly in elevation showing another embodiment of the invention;

Figure 22a shows a modification of the air intake system of the engine of Figure 22;

Figure 22b shows a modification of the gas discharge portion of the engine of Figure 22; and Fig. 22c is a rear end elevation taken as indicated by the arrows 22c in Figure 22b.

With reference first to the embodiment of Figures 1 and 2, numeral 20 designates generally an acoustic wave conduit in the form of a hollow ring or torus. This conduit may consist of a heat resistant metal pipe formed into a circle, or may be fabricated in any other conventional manner found convenient. The torus 20 has, on its inside or concave surface, a fluid inlet 21, and it also has, in a position diametrically opposite from inlet 20, a fluid outlet 22 connected into its outside or convex surface.

A sound wave generator means is provided, and while this may take various forms, it is preferred to employ a combustion type, here indicated as including a fuel intake pipe 24 and a spark plug 25. The spark plug 25 is mounted in one side of the torus approximately half way between the fluid inlet and the fluid outlet, and the fuel intake pipe 24 discharges to the interior of the torus somewhat in back of the spark plug or in other words, between the spark plug and the fluid inlet, so as to provide a fuel combustion zone 26 between the fuel inlet pipe and the spark plug. The fuel inlet pipe may be regarded as feeding periodic charges of fuel to the combustion zone under the control of any suitable metering device, as for example under the control of a fuel metering valve 27 operated at a predetermined synchronous speed by any suitable drive means, as for instance an electric motor indicated conventionally at 28. As will be explained later the electric motor 28 is arranged to operate the fuel metering valve 27 at a frequency corresponding with a resonant frequency of the acoustic cavity formed by the torus 20.

It is preferred, and a feature of the embodiment of Figure 1, that the sound wave generator be duplicated on the two sides of the torus. Accordingly, there is shown in Figure 1, directly across from the spark plug and fuel feeding provisions already described, a fuel feeding pipe 24a, a spark plug 25a, a combustion zone 26a, a fuel metering valve 27a and an electric motor 28a. The fuel valves 27 and 27a are properly synchronized with one another in accordance with the principles to be explained hereinafter.

Operation is as follows: Air for combustion enters the torus at 21, and travels in both directions therearound toward outlet 22 under pumping influences to be presently explained. Charges of fuel are cyclically and alternately introduced to the combustion zones 26 and 26a via the fuel pipes 24 and 24a, the frequency of fuel charge introduction being a resonant frequency of the sonic cavity or conduit formed by the torus. These fuel charges are metered by the valves 27 and 27a, which are driven at the said resonant frequency by properly controlled and synchronized electric motors 28 and 28a. Suitable motors for this purpose, and suitable synchronizing provisions, are well within the knowledge of the art and need not be explained in detail, it being sufficient to note that the valves 27 and 27a are driven so as to alternately meter fuel charges to the fuel pipes 24 at the resonant frequency of the circular pipe, the fuel valves being operated at 180° phase difference. Any suitable gear reduction means (not indicated) may, if necessary, be employed between the synchronously driven valve motors and the valves.

Combustion is initiated by synchronously operated spark plugs 25 and 25a, which are also cyclically energized to spark alternately, with 180° phase difference. These spark plugs are of course energized just after the fuel introduction, and it will be understood that any suitable ignition system may be employed, but that the same must be properly synchronized with the fuel metering valves 27 and 27a. For example, the same motors that drive the fuel metering valves 28 and 28a may also drive magnetos 29 and 29a, connected to the respective spark plugs. With many fuels it has been found that a lingering tail-flame can be maintained, after each combustion cycle, behind the turbulence baffles 30 and 30a. Each new charge is then ignited by the tail-flame; and the spark plugs are in such cases necessary only for starting.

Assume first a fuel explosion at combustion chamber region 26 resulting from ignition by plug 25 of a fuel charge introduced via supply pipe 24. Such explosion initiates a pressure pulse, which starts waves of compression traveling with the speed of sound in the gases in both directions around torus 20. These two oppositely traveling compression waves meet on the opposite side of the torus to create a pressure peak at zone P', whence they are reflected and return in reverse directions, again around opposite sides of the torus, to meet again at their point of origin, designated P, to create a pressure peak at that point. The zones P and P' are not diametrically opposite since the wave travels faster in the hot gases downstream from combustion than it does in the cold intake air. The fuel feeding system is so timed that a new fuel charge is introduced at 24 just prior to the meeting of these waves, and the said pressure peak compresses this charge, whereupon, at the time of the said pressure peak at P, the spark plug is again energized, or the compressed charge becomes ignited by the previously mentioned "tail-flame," to explode the second fuel charge, whence the cycle is repeated.

Assuming a fuel explosion at zone P coincident with each pressure peak at P, pressure anti-nodes (zones of maximum fluid pressure variation) will appear at zones P and P', and will hereinafter be designated by said characters. Halfway between said pressure anti-nodes, at the locations of the inlet 21 and outlet 22, will be velocity anti-nodes V and V' (zones of maximum fluid velocity variation). An acoustic standing wave is thus established around the torus, with velocity anti-node zones V and V' at inlet 21 and outlet 22, respectively, and with a pressure anti-node P in the upper half of the torus, at combustion zone 26, and a pressure anti-node P' in the lower half of the torus, located symmetrically with reference to pressure anti-node P. It will be seen that with such timing of the combustion system, the torus is a half wave in length from the zone P around to the zone P', and a quarter wave in length from the inlet 21 and outlet 22 to each of zones P and P'. The greater distance from P to P' through V' is due to the greater speed of sound in the hot gases.

If the second combustion means 24a and 25a is employed, fuel charges will be ignited 180° of the cycle out of phase with respect to the explosions produced at combustion zone 26, and it will be seen that the cyclical explosions so caused at combustion zone 26a will be timed to occur coincidently with the pressure peaks appearing at zone P' as a result of the explosions produced at zone 26. The power of the system is thus doubled, and an increased strength standing wave is gained, but the nature of the standing wave is not altered.

Considering now the fluid velocity zones V and V', it will be evident that following an explosion say at combustion zone P, fluid will move at relatively high velocity in left handed and right handed directions, respectively, through the velocity anti-node zones V and V', reaching peaks of velocity 90° in time of the cycle following the explosion. The fluid velocity then falls towards zero as the pressure at P' is built up, reaching its minimum coincidently with the pressure peak at P', which event occurs 90° following the time of velocity peaks at V and V'. The gas flow then reverses direction through the zones V and V', reaching maximum velocity in this back flow within another 90° of the cycle, after which the velocity decreases as the new pressure peak is built up at P. These high alternating velocities in the region V can be, in some cases, enough in themselves to cause periodic introduction of the fuel to the combustion; thus making possible the elimination of the periodic valves 27 and 27a in the fuel lines, and allowing the use of steady flow of fuel into the intake section.

Very high fluid velocity is thus achieved through the curved zones V and V' of the torus twice during each cycle of the wave, and may reach or even somewhat exceed the velocity of sound. Owing to the curvature of the zones V and V', and the consequent inward deflection of the fluid by the outer peripheral walls of the torus, very substantial centrifugal forces are set up in the fluid, causing it to be crowded radially outward the outer peripheral walls, and thereby establishing a substantial pressure differential in a radial direction across the torus at zones V and V'. This pressure differential creates a pressure depression at the inner wall, and hence at air inlet 21, with the result that outside air is sucked into the system through 21. This pressure differential also creates an elevated pressure at the outer wall, and hence at outlet 22, so that fluid in the system is discharged at 22. Moreover, a pressure gradient is created through the conduit between the inlet and the outlet. Fluid is thus pumped through the system, in at 21, and out at 22, by the combined action of the standing wave set up in the system and the development of flow inducing centrifugal forces, as a result of causing the fluid particles moved by the standing wave to change their direction adjacent the fluid inlet and the fluid outlet, the change of direction, or deflection, and the location and orientation of the inlet and outlet, being such as to develop forces which will be in aid of the inflow at 21 and in aid of the outflow at 22. It will be clear that, broadly, inflow and outflow fluid path defining configurations have been provided which are differently arranged relatively to the direction of fluid flow in the velocity anti-node regions of the conduit, furnishing an overall pressure gradient that produces a net fluid flow through the conduit. Net pumping of air through the system is thus achieved without use of valves.

Figure 3 shows a modification of Figures 1 and 2, wherein the conduit 20b is interrupted at the lower pressure anti-node zone and provided with rigid end closure reflecting walls 34 and 35. Also, in this embodiment, but one wave generator means is employed, namely, the one located at the upper pressure anti-node P, and shown again to consist of a fuel supply pipe 24b and a spark plug 25b. Otherwise, the system may be the same as that of Figures 1 and 2, and corresponding reference numerals are accordingly employed for similar parts, but with the suffix b added in the case of Figure 3.

Operation of the system of Figure 3 is exactly like that of Figure 1, the only difference being that simultaneous pressure anti-nodes P' and P'' exist adjacent the closure walls 34 and 35, in place of the single pressure anti-node P' when the conduit is in the form of a complete ring or torus. Thus velocity anti-nodes exist at V and V' as before, and the same type of standing wave is established, resulting in the development of the centrifugal forces which pump the fluid in at the inlet and out at the outlet.

Attention is particularly called at this time to the fact that in the embodiments of Figures 1–3, the inlet is on an inside or concave curve, while the outlet is on an outside or convex curve, thereby affording maximum benefit from the centrifugal force components developed as described in the regions V and V'. In certain later described embodiments there is some departure from this arrangement, but operation in accordance with the invention is still achieved, as will appear.

Reference is next directed to Figure 4, showing diagrammatically a simplified quarter-wave version of the invention. In this instance there is provided a curved sonic pipe 40, having an open end 41, and equipped at its other end position with an acoustic wave generator means 42, which in this example is simply in the form of a piston 44 fitted for reciprocation with a close sliding fit in pipe 40, and driven through connecting rod 45 and crank 46 from any source of speed-controlled and synchronized rotary power, such as electric motor or engine 47. It will be understood that this motor or engine must be synchronized to drive piston 44 at an oscillation frequency which is a resonant frequency of the open-ended pipe 40, so as to establish a standing wave in the pipe, with a velocity anti-node V adjacent the open end and a pressure anti-node P adjacent the piston. Curved pipe 40 has also, near or within velocity anti-node region, fluid intake opening 48 and fluid discharge opening 49, the former located on a longitudinally concave external curve of the pipe, and the latter on a longitudinally convex external curve of the pipe.

In the operation of the apparatus of Figure 4, fluid rushes back and forth through the velocity anti-node region V, and as a result of the curvature of the pipe, is deflected so as to set up centrifugal force components as before, which in turn create a pressure differential across the velocity anti-node region, with a minimum pressure adjacent the inside periphery of the pipe, and a maximum pressure adjacent the outside periphery thereof. This differential pressure condition sucks in outside fluid at 48, and discharges internal fluid at 49, thus pumping fluid through the system by the development of centrifugal forces under acoustic standing wave drive.

It may here be noted that many of the systems disclosed herein, particularly when equipped with a piston drive means, as in Figure 4, are adapted for pumping of water as well as gaseous fluids, and may hence be employed for marine propulsion. In any such case, the propulsive effect described herein is of course achieved by virtue of the jet discharge at 49.

In Figure 5 is shown a system similar to Figure 4, but avoiding the open end of the sonic pipe. For convenience, corresponding parts in the embodiments of Figures 4 and 5 are identified by the same reference numerals, but with the suffix a added in the case of Figure 5. As will be seen, the sonic pipe in this instance, instead of terminating in an open end, has beyond fluid inlet 48a and fluid outlet 49a, a short pipe section 50 terminating in a capacitance chamber 51, the acoustic inductive reactance of the pipe section or neck 50 being balanced against the acoustic capacitance reactance of chamber 51 to produce a condition of effectively zero impedance at the junction with the sonic pipe. This zero impedance combination of acoustic elements thus replaces the open pipe end 41 of the embodiment of Figure 4, while giving the same standing wave conditions in the pipe. Thus, the apparatus of Figure 5 operates to produce a standing wave characterized by pressure anti-node P adjacent piston 44a and velocity anti-node V in the region of inlet 48a and outlet 49a. Pumping of fluid inward through 48a and outward through 49a is accomplished in exactly the same way as previously described in connection with Figure 4.

Reference is next directed to Figure 6, showing a system similar to Figure 4, but with the open end 41 of Figure 4 replaced by a quarter-wave pipe section. In Figure 6, parts corresponding to parts in Figure 4 are indicated by similar reference numerals but with the suffix b added. Pipe 40b thus has, in lieu of the open end 41, a quarter-wave extension 54, which may be curved like the pipe 40 of Figure 4, so that the whole forms substantially a half turn, with fluid inlet 48b on the inside periphery of the pipe, halfway along the length thereof, and with fluid outlet 49b on the outside periphery of the pipe, halfway along the length of the pipe. In this case, operation is similar to that accomplished in Figure 4, in that a pressure anti-node P appears adjacent piston 44b (assuming of course resonant oscillation of said piston by its power source), a velocity anti-node appears at V, in the region of inlet 48b and outlet 49b, and a second pressure anti-node P' appears at the end of the curved leg 54. As in the other embodiments of the invention, the fluid oscillating back and forth in the pipe in the region of velocity anti-node V is subject to centrifugal force creating a pressure differential across the pipe which results in fluid inflow at 48b and fluid outflow at 49b.

Figure 7 shows a further modification, characterized by the use of a sonic conduit 60 forming a half circle, i. e., of 180° angular extension, this conduit having midway of its length and on its inside periphery a fluid inlet 61, and having midway of its length, but on its outside periphery a fluid outlet 62. In addition, the pipe 60 has a transverse partition wall 63 extending from a point just short of piston 44c to a point a short distance beyond the fluid inlet 61 and fluid outlet 62. In operation, piston 44c is driven at a resonant frequency of the pipe 60, so as to create pressure anti-node conditions P and P' at the two ends of the pipe, and a velocity anti-node condition midway of the pipe adjacent the inlet 61 and below the partition wall 63, as indicated at $V_1$ and also a velocity anti-node condition $V_2$ on the opposite side of the partition wall 63, in the region of outlet 62. In effect, the partition 63 divides the one leg of pipe 60 (the right hand leg as viewed in the figure) into two pipes connected at P and having velocity anti-nodes $V_1$ and $V_2$ at the ends remote from such connection. The left hand leg of the pipe, on the other hand, is a quarter wave in length, and consists simply of a single undivided pipe, as will be clear. In operation, the fluid oscillating back and forth at the velocity anti-node regions $V_1$ and $V_2$ set up centrifugal forces which induce inflow of air inwardly through 61 and outwardly through 62.

With reference next to Figure 8, the apparatus will be seen to be the same as in Figure 7, with the exception that the partition wall 63a extends around and through the left hand leg of the pipe, almost to the end of the latter. Here conditions are actually much similar to those found in Figure 7, the exception being the clear and complete separation of the velocity anti-node region $V_1$, from the velocity anti-node region $V_2$. In the final effect, however, the behavior of the system is essentially that of the earlier described embodiments. The inflow fluid oscillating at region $V_1$ of course travels closely adjacent the partition wall 63a, rather than adjacent the outside peripheral wall of the apparatus, so that a pressure differential is created between the concave inside wall of the apparatus and the partition wall 63a, thus providing the necessary pressure depression at the inlet to secure the desired suction. Figures 7 and 8 taken together are primarily interesting in that they show how the half wave type of pipe shown in Figure 6 may be increased in effective length to provide three quarter wave pipe lengths in Figure 7, or two half wave lengths as in Figure 8. Essentially, the embodiment of Figure 8 does not differ from the original embodiments of Figure 1.

Figure 9a is of further interest in that it shows a modified cross-section of Figure 8 wherein the partition wall, this time indicated by numeral 63b, is spaced along its longitudinal edges from the sides of the pipe. Such construction will permit a small amount of flow from one side of the partition to the other, but will not affect the essential operation of the system. In other words, the embodiments of Figures 6 and 8, with the latter having either the section shown in Figure 9 or the section shown in Figure 9a, are essentially equivalent.

It will be noted that the partitions of Figures 7 or 8 cause part of the inflow to pass through a pressure anti-node zone. This permits maintenance of combustion at the pressure anti-node so that the apparatus can be driven similarly to Figure 1. Figure 6, on the other hand, is limited to piston drive because intake air flows almost directly across to discharge opening 49b.

The embodiment of Figure 10 consists of two semi-circular pipe lengths 70 and 71, having two corresponding ends interconnected by a chamber 72 in which is located resonant sound wave generator 73. In the present instance, this generator 73 comprises a piston 74 driven from a synchronized power source 75 in a way previously indicated in connection with other figures, so as to resonate the two pipe lengths 70 and 71 and establish standing waves therein. Each pipe length 70 and 71 is a half wave in length, and it results that there is created in chamber 72 a pressure anti-node P, at the far end of pipe 71 a pressure anti-node P''. Velocity anti-node regions V and V' are established at the midpoint regions of the two pipes 70 and 71, as indicated. Opening into inside wall of pipe 70, adjacent velocity anti-node V, is fluid inlet 77, and opening from the outside wall of pipe 71, opposite velocity anti-node region V', is outlet 78. While for convenience of illustration, the two pipes 70 and 71 are in a single plane, it will become evident that this is not necessary, and the pipes may be in planes at right angles to one another, parallel to one another, or in any other relationship found convenient. The operation of the apparatus of Figure 10 is again like that of Figure 8, or indeed like that of Figure 3, standing waves of similar character being established in each case, and there being in each case an effective pipe length of a total of one wavelength with pressure and velocity anti-nodes distributed in equivalent positions. Considering Figure 10 in more particular, it will be seen that the piston 73 will send pressure pulses along the lengths of both of the pipes 70 and 71, and that these pressure pulses, after reflection from the ends of the two pipes, will return to the pressure anti-node region P in chamber 72 coincidently with the next pressure pulse, and so on, in a manner such as will establish the described standing wave and conditions as already described. The fluid flow in the velocity anti-node regions of the two curved pipes 70 and 71 will again be subject to centrifugal forces which will develop an inflow suction at 77 and an outflow discharge pressure at 78. It can be seen that combustion drive of the wave can be substituted for the piston 73 because intake air flows through region P, from V to V'.

With attention now to Figure 11, an apparatus is disclosed having again two interconnected half wave pipe sections 80 and 81, which sections may be in the same plane, or different planes. A cylinder 82 fitted with a piston 83 communicates with the junction point of the two pipe sections, and is driven from power source 84 at a synchronous speed to resonate the fluid in the two pipes. Standing waves accordingly appear, and these will be equivalent to those previously considered in connection with Figure 10 and other figures, having a pressure anti-node region P at the juncture of the two pipes 80 and 81, pressure anti-nodes P' and P'' at the far ends of the two pipes 80 and 81, and velocity anti-node regions V and V' midway of the length of the two pipe sections 80 and 81. A fluid inlet 86 opens through the inside curved wall of pipe 80 in the region of velocity anti-node V, and a fluid outlet 87 opens through the outside curved wall of pipe section 81 in the region of velocity anti-node V'. The oscillating gas flow in the two regions V and V' will again develop centrifugal forces establishing inflow at 86 and outflow at 87.

It will be noted that in all of the exemplifications of the invention described in the foregoing, the fluid inlet is on an inside curve, whereas the fluid outlet in on an outside curve. There are certain embodiments of the invention which do not have this feature, and a few exemplifications of these will now be discussed.

Figure 12 thus shows an embodiment of the invention similar to Figure 3, but with half of the torus of Figure 3 straightened out into a straight pipe section, both ends of the pipe being closed, as in Figure 3. Parts in Figure 12 corresponding to like parts in Figure 3 will be identified with the same reference numerals, but with the suffix c added in the case of Figure 12. It should be evident that a standing wave may be established in the system of Figure 12 the same as in Figure 3, with a pressure anti-node, P at the combustion zone, pressure anti-nodes P' and P'' at the two ends of the pipe, and velocity anti-nodes V and V', in the regions of the fluid inlet 21c and fluid outlet 22c, respectively. Operation of the apparatus of Figure 12 will be similar to that of Figure 3, with the exception that no centrifugal force effects occur in the straightened leg of the pipe. Nevertheless, because of the centrifugal force effects at velocity anti-node region V', sufficient pressure differential is induced to effect pumping of fluid in at 21c and out at 22c.

Figure 13 indicates simply the reverse arrangement of Figure 12, where the other half of the ring of Figure 3 has been formed as a straightened leg. Otherwise, the parts are exactly similar to Figure 12, and corresponding members are indicated by corresponding reference numerals but with the suffix d employed in the case of Figure 13. Here, centrifugal force effects take place at V to induce inflow into the system, but there are no centrifugal force effects at region V' to assist in discharge of fluid. However, the centrifugal force effects at region V are sufficient to establish a pressure differential which will pump fluid through the system, inward at 21d, and out at 22d.

Figures 14 and 15 show two further exemplifications of the invention, in the first of which the fluid inlet 21e opens into a convex or outside curve of the pipe, the same as does fluid outlet 22e, and in the second of which, the fluid outlet 22f leads from a concave or inside curve of the pipe, the same as does fluid inlet 21f. Otherwise, the embodiments of Figures 14 and 15 are similar to Figure 3, and corresponding parts are identified by corresponding reference numerals but with the suffixes e and f employed in the case of Figures 14 and 15, respectively. Figure 15 shows additionally optional outlets 22f' and 90, useful for some purposes presently to be mentioned, but these may be disregarded for the present.

It wil be evident, referring to the embodiment of Figure 14, that the induction of air on a convex curve of the pipe will be opposed by the centrifugal force effective on the fluid stream within the pipe at that region. It will likewise be evident, referring to the embodiment of Figure 15, that discharge of fluid from the concave side of the pipe, as at 22f, will be opposed by prevailing centrifugal force effects on the fluid stream in the pipe. However, both the embodiments of Figures 14 and 15 are made operative by having the curvature of the pipe greater in the velocity anti-node region where centrifugal force effects are favorable than they are at the velocity anti-node region where the effects of centrifugal force are unfavorable. Thus, in Figure 14, the outlet 22e is on a sharper curve than is the inlet 21e. Hence, centrifugal force effects will be greater in the oscillating fluid at the region V' than at the region V, and a pressure differential will hence exist between the inlet and the outlet, causing pumping of fluid to occur through the system. In the case of Figure 15, fluid inlet 21f is on a sharper curve than is fluid outlet 22f so that the centrifugal force effects in the region V will predominate over the unfavorable centrifugal force effects in the region V'; hence, a pressure differential will occur between the inlet and outlet, and fluid will again be pumped through the system. The word "curvature," as used in the claims and elsewhere, is intended to include all physical meanings of deflection, including sharp angles or bends.

One of the best uses for this invention is as a high efficiency burner, such as for the combustor section of a gas turbine. Actual tests have shown surprisingly high efficiency for a combustion process when occurring in a self-excited acoustic field. Pulverized coal can be burned with extremely high completeness of combustion in a very compact sonic burner. And the self-pumping characteristic of this invention is then an additional benefit in flowing the combustion air.

Another use of the centrifugal effect made possible by this invention is the centrifuging action on materials of different densities. Referring to Figure 15 we can see a plurality of discharge openings located at the anti-node zone V'. It will be evident that, recognizing a radial centrifugal field at V' due to deflected anti-node oscillations, the heavier components of the fluid will tend to crowd to the outside of the curve. And the lighter material can be discharged from intermediate opening 22f', with the lightest being available at opening 22f. When burning coal this feature is a special benefit because, by sacrificing some pumping effect with a gas discharge such as 22f or 22f', the higher centrifugal point at the entrance to pipe 90 can be used for ash removal. The ashes can be collected in receiver 91.

In consideration of the many possible uses for the acoustically driven centrifugal effect of this invention it is accordingly the intent that the element identified as either the intake or discharge opening, in the claims and elsewhere, is to be considered in the broad sense of a strategically located opening utilizing some benefit from an acoustically driven propelling or jetting effect.

Figure 16 shows a multi-stage form of the apparatus, based on the embodiment of Figure 1. The inner torus of Figure 16 may be precisely like that of Figure 1 and may contain the same sound wave excitation source, as indicated. In addition, however, it is shown with optional auxiliary air intake pipe 96, located on the inside, and diametrically across from intake pipe 21'. For convenience, parts of Figure 16 corresponding with parts of Figure 1 are identified by the same reference characters, but with the use of primes in the case of Figure 16. Surrounding torus 20' is a larger torus 100, which may otherwise be of a character identical to that of torus 20', and may be provided with spark plugs 101 and 101a, and fuel intake pipes 102 and 102a. The provisions for feeding fuel to the fuel supply pipe, as well as energizing the spark plugs, are for simplicity omitted from Figure 16 but may be of the same character as previously described in connection with Figure 1. The air intake for torus 100 consists of a short length of pipe 106 leading from the outside periphery of torus 20' to the inside periphery of torus 100 in the region of the air intake 21' for the inside torus 20'. The fluid discharge outlet 22' for torus 20 may simply discharge separately, or may, if desired, open into the inside periphery of torus 100, and the latter has, daimetrically across from its intake pipe 106, an outlet 108 leading from its outer periphery. An additional torus might be added around the outside of torus 100, and so on, to any number found feasible in practice. The pipe 106 is the necessary interconnection because it is via this path that boosted intake air is supplied to each successive torus. The interconnection 22' is thus optional.

Considering the operation of the apparatus of Figure 16, it will be seen that the intake air flowing in through intake 21' will be set into oscillation at velocity anti-node region V, and centrifugal force effects developed in this oscillating fluid will cause a portion of the same to be delivered via pipe 106 to the intake of outside torus 100. It will be seen that this air so delivered from the inner to the outer torus will arrive within the latter at an initial pressure, the inside torus thus functioning as a supercharger.

Exhaust fluid delivered from torus 20' through outlet pipe 22' enters torus 100, to be delivered with the outflow from the latter via the discharge outlet 108.

It will of course be understood that the outside torus 100 will function just as does the inside member 20', setting up pressure anti-node conditions $P_1$ and $P_2$, and velocity anti-node conditions $V_1$ and $V_2$, as indicated. Fluid discharging from torus 20' via pipe 22' into torus 100 will be added to the oscillating fluid in the region $V_2$ of the latter, increasing the pressure level accordingly, and the combined gases will be discharged by reason of the centrifugal force effects as well as the elevated pressure conditions by way of the final discharge outlet 108. In this way, by a multi-stage process, a very great pressure differential can be built up between the air intake of the first torus and the discharge outlet of the last torus of the multi-stage group. The operating wave cycles of the two or more multi-stage separate units can have any desired interrelated phasing.

The high average pressures in the outer torus permit large acoustic pressure amplitude with resulting large pressure changes, thus causing high expansion ratio with resulting high efficiency of transfer of heat into wave energy during the combustion process at $P_1$ and $P_2$. These high pressures and high thermal efficiencies are especially valuable for high velocity jets and for high efficiency gas turbines.

It is possible to reduce the secondary loss of energy from the system by pipes 21', 96 and 108 provided they are sufficiently long to produce a proper acoustic impedance for wave energy at the junction with the torus. I have also found that there is usually a best length for pipes 22' and 106. Adjustable throttle valves $t$, $t'$ and $t''$, such as shown in pipes 21', 96 and 108 can be used to control the power rate of the system. These accessory pipe and throttle features are also equally usable on many other embodiments of my invention.

Fig. 17 shows another embodiment of the invention, and in which numeral 120 designates a U-shaped sonic pipe, comprising legs 121 and 122 connected by semicircular pipe section 123, the latter having, opening from the midpoint of its convex side, fluid discharge outlet or tail pipe 124. Synchronized acoustic wave generator means are employed in connection with the closed ends of the two legs 121 and 122, and as here shown these means are of the cyclical combustion type. Thus, the two legs are equipped adjacent their closed ends with spark plugs 126 and 127, and while no means for energizing these is shown in Fig. 17, it is to be understood that these may be energized in proper synchronous relation, 180° out of phase with one another, by any suitable synchronized ignition system, for instance of the type shown in Fig. 1 of the present application. An alternative is indicated in Fig. 2 of my aforesaid Patent No. 2,546,966. Fuel feeding means of the type shown in Fig. 1 might be employed, and may be considered as an alternative, but I show in this instance carburetors 130 and 131 in conjunction with air induction pipes 132 and 133, respectively, the latter opening into the legs 121 and 122 near the closed ends of the latter. The two closed end portions of the legs 121 and 122 form combustion chambers 133 and 134, respectively, the combustion mixture of fuel and air entering through pipes 132 and 133 reaching these combustion zones and being ignited by the spark plugs 126 and 127. By energizing the spark plugs cyclically, in 180° opposition, each at the resonant frequency of the pipe 120, or by relying upon tail-flame ignition, the fuel charges are exploded alternately in such way as to send pressure pulses alternately from one end of the U tube to the other, the resonant occurrence of the explosions causing a standing wave to be established in the pipe with pressure anti-nodes P and P' at the two combustion zones, and with a velocity anti-node V in the pipe adjacent the outlet 124.

One substantial difference between the embodiment of Fig. 17 and those earlier described will be noted in that the air intake into the main gas column is at a pressure anti-node zone rather than at a velocity anti-node zone. This is made possible by employing induction pipes 132 and 133 of high acoustic impedance. Pipes of quarter wavelength for the resonant frequency of the wave generated in the U-tube 120 will serve the purpose. For a more complete explanation of the phenomena here involved, reference should be had to my Patent No. 2,731,795, issued January 24, 1956. As there explained, a valveless air intake to a pressure anti-node zone may be employed provided the air intake pipe has a sufficiently high acoustic impedance, so as to prevent loss of standing wave energy from the pressure anti-node zone through said intake pipe.

In the operation of apparatus of Fig. 17, therefore, fuel and air mixture enters the two combustion chambers via the two induction pipes 132 and 133 and these mixtures are alternately exploded to establish the standing wave already explained. At the velocity anti-node region V, products of combustion oscillate back and forth around the curved pipe section at maximized velocity and at resonant frequency, and centrifugal force effects crowd these oscillating gases toward the outer side of the curved pipe section. There, the oscillating gases encounter the sharp annular edge 136 formed at the intersection of the flaring tail pipe 124 and the sonic pipe 120. Preferably, the sides of the flaring tail pipe 124 make an acute angle with sonic pipe 120, so as to form a somewhat sharpened annular edge 136. These sharp edge configurations formed in the pipe walls at the velocity anti-node region intercept a large portion of the oscillating gas particles crowded by centrifugal force toward the outer wall of the curved pipe section 123, and deflect the same into the tail pipe 124, to be discharged to atmosphere. The edges thus provide a deflector configuration which intercepts a portion of the oscillating gases at the velocity anti-node region, and thence deflects the intercepted gases to final discharge.

Attention is called to the fact that in the case of the engine of Fig. 17, the gases are forced out the tail pipe by two separate force effects, both motivated by the kinetic energy of the oscillating gases of the velocity anti-node. One effect is that of centrifugal force, owing to the outer wall of the conduit being longitudinally curved or deflected in the region of the discharge port, which causes some of the oscillating gas particles to be correspondingly deflected, and therefore to crowd outward and so pass through the tail pipe. The second effect is that owing to some of the oscillating gas particles being intercepted and deflected outward ("peeled-off") by the sharp edge 136 at the junction of the conduit with the flaring tail pipe. It will be seen that the high velocity gas particles intercepted and deflected outward by these cavity wall configurations are, in this case also, forced out the tail pipe by force components motivated by the kinetic energy of the oscillating gas particles of the velocity anti-node.

It will be noted that there are no flow inducing force effects at the air intake portions of the apparatus of Fig. 17. However, the provision for force-induced discharge creates the necessary pressure gradient or differential between the discharge outlet and intake pipe, and air is accordingly pumped through the system without the necessity of blowers. Of course, assuming a jet propulsion application of the invention, and assuming also that the air induction pipes 132 and 133 are provided with forwardly facing air scoops, as indicated at 140 in Fig. 17, air will enter the system through the two pipes 132 and 133 under ram pressure. The flow inducing force effects gained at the velocity anti-node region V would then augment the discharge pressure, not being indispensable to pumping of air through the system, but very greatly aiding the pumping effect, and hence the effectiveness of the system.

Many of the disclosed forms of my jet engine provide a means for intercepting and discharging a portion of the oscillating gases at a velocity anti-node which is located between two pressure anti-nodes. Reverse flow through the discharge port back into the system is in each case reduced on the reverse flow half-cycle at the velocity anti-node region by the pressure within the velocity anti-node region of reverse flowing internal gases. Reverse flow into the system being thus curtailed, a net pumping action is set up through the discharge port. Moreover, the system retains within it the necessary gas to support the desired pressure cycle, and the operation of the system is thus made independent of reverse flow gas sucked in through the discharge outlet on alternate half-cycles. The invention will be seen to involve the broad generic concept of generating a pumping force in a fluid by deflecting oscillating gas flow in a resonant acoustic wave guide at a velocity anti-node, making use of the seat of kinetic energy at the velocity anti-node to motivate the action.

With reference now to the embodiment of Fig. 18, numeral 160 designates generally a gas conduit or pipe, of generally cylindrical form, having a head end portion 161, into which opens a valveless fuel and air intake pipe 162, the latter having an air scoop 163 at its forward end. The rearward end of pipe 160 is flared or formed with a skirt portion, as indicated at 164, and received within this skirt portion, an annularly spaced therefrom, is a convergent forward end portion 165 of a conduit or pipe extension 166, provided with a closure 167 at its far end, the portion 165 forming a gas deflecting wall element. The skirt portion 164 of pipe 160 and the convergent portion or gas deflector 165 of pipe 166 are connected, as by means of webs 168, leaving an annular gas passage 169 for discharge of products of combustion. As will be seen, the convergent portion 165 of pipe 166 terminates at its forward end in an annular edge 170 spaced inside the pipe 160, and in a position to intercept a portion of the oscillating gas particles traveling from left to right at the juncture of the pipes 160 and 166. As will be seen, the portion of this gas intercepted by the edge 170 is deflected into the annular gas discharge passage 169 and so discharged to atmosphere in a generally outward and rearward direction.

The head end region 172 of pipe 160 forms a combustion zone, wherein fuel, supplied to intake pipe 162 as by carburetor 173, together with air taken in by scoop 163 and supplied to region 172 by the pipe 162, are periodically burned. To initiate combustion, a spark plug 174 is employed, energized by any suitable ignition system, not necessary to illustrate herein.

The pipe sections 160 and 166, taken together, form a half-wavelength resonant acoustic pipe, the sections 160 and 166 being each of one-quarter wavelength. The operation of both quarter wave and half wave resonant engines is understood in the art, and it will be understood how explosions taking place at the combustion region 172 at the resonant frequency of members 160 and 166 set up an acoustic standing wave action, producing a pressure anti-node P at the combustion region, and a velocity anti-node V at the end of pipe section 160. Pipe section 166 is of the same effective length as pipe section 160, and accordingly, a pressure anti-node P' is established at the closed end of pipe section 166. Under these circumstances, periodic pressure pulses, at the resonant frequency of the pipe sections, are developed by intermittent combustion at zone 172, causing periodic pressure peaks at regions P and P', and oscillating gas flow longitudinally of the pipe sections 160 and 166 at region V.

The valveless air intake pipe 162 is made of substantially quarter wavelength for the resonant frequency of the pipe sections 160 and 166, or at least is designed for high acoustic impedance for the resonant frequency of the pipe sections 160 and 166, as explained hereinabove in connection with Fig. 17.

The overall operation of the engine of Fig. 18 is as follows: Air is continuously supplied to the combustion region 172 through pipe 162, and fuel is supplied by carburetor 173. Operation is initiated by means of spark plug 174, which may be energized by any suitable ignition system at the resonant frequency of the pipe 160. Explosion taking place at 172 generates a pressure pulse, which sets up a pressure wave traveling longitudinally of the gas column in the pipe sections 160 and 166 with the speed of sound. Reaching the far end 167, a half-cycle later, this wave is reflected and returned longitudinally towards the head end 161. At this same instant, the pressure at the head end 161 is at a negative pressure maximum. The wave reflected from 167 reaches head end 161 a half-cycle later, and a positive pressure peak is experienced thereat. At this instant, a negative pressure maximum is experienced adjacent end 167. The reverse traveling positive pressure wave (from 167 to 161) is reflected from 161, and at the same instant, a second explosion occurs at 172, producing a re-enforced positive pressure pulse or wave which then travels longitudinally of the pipe sections 160 and 166 in the original direction (from 161 to 167). The gas at velocity anti-node V travels first in one direction, and then the other, reaching maximum flow velocity as the described traveling waves pass through it, and reaching zero velocity during pressure peaks at P and P'. Thus there is established a half-wave length standing wave, with pressure anti-nodes at P and P', and a velocity anti-node at V.

After operation has once been started, the ignition system energizing spark plug 174 may be disconnected, since an "after-flame" retained in the region 172 is sufficient to ignite the fuel on each positive pressure peak of the standing wave occurring at region 172. As a result of the acoustic standing wave action, the region V, as already mentioned, is one of high velocity alternating gas oscillation, the gas traveling in reverse directions on alternate half cycles of the standing wave, as explained, and as indicated by the arrows. The annular edge 170 acts to skim or peal off an outer annular layer of the oscillating gas column on every alternate half cycle (the half cycle wherein the gas flow is from P to V) in the general region identified by the letter V, and this intercepted gas is deflected outwardly and rearwardly through the annular opening 169, as indicated by the arrows. The velocity anti-node V will again be seen to be the seat of kinetic energy drawn upon to motivate lateral deflection of some of the oscillating gases, and hence to establish the desired net pumping action through the engine.

The center portion of the oscillating gas column at the zone V, not peeled off by the annular scoop or deflecting wall continues its rearward motion, in the direction of P', and the wave action in the column then builds up a momentary pressure peak at P'. The wave is thereupon reflected from P', to cause a forwardly flowing gas column motion at V, occurring one half-cycle after the rearward motion. This gas column motion from extension 166 back into pipe 160 supplies the needs of the pipe 160 to maintain the compression cycle at P. Reverse flow through the scoop port 168, from outside atmosphere back into pipe 160, is consequently materially reduced, and there is hence a material net outward and rearward flow of gases through the scoop port. This assures the desired pumping effect through the apparatus. Another advantage may be recognized, in that it is known that the conventional apparatus of this class, without the extension 166, tends to become starved for lack of air owing to poor reverse flow through the discharge outlet at high forward velocities. The present apparatus will not become thus starved, because adequate air can always be obtained through the intake pipe, and a portion of this air is maintained in the extension 166, to be supplied to the main pipe 160 during each reverse flow half-cycle in the pipe 160.

The gas discharge configuration is thus in the nature of a "scoop-port," utilizing the velocity energy of the gases participating in the velocity anti-node oscillation to effect their lateral deflection and discharge, and constitutes an improved means for discharging hot gases from the device with a minimum of "sucking-in" of outside atmosphere at this point and consequently with a net outflow effect.

In Figs. 19 and 20 the apparatus has a generally cigar-shaped body 180, of either circular, elliptical, or lentiform cross-section, and has a longitudinal partition 181 extending laterally from side to side and from a point spaced a short distance from its nose end 182 to a point spaced a short distance from its tail end 183. This partition may be supported as by struts or webs such as 184. It should be of high heat resisting material, and may be a slab of carbon. Air may be taken into the nose by way of ports 186, controlled in this instance by reed valves 186a. Fuel is introduced a nose-end combustion region 187 by fuel injector pipe 188.

Midway of the length of the body 180, the body is formed, above partition 181, with an air intake port 190, this port 190 being in the nature of an arcuate slot extending circumferentially around the upper half of the body. A scoop 191 just outside the port 190 intercepts air when the apparatus is in forward motion, and directs it into the port 190, and then into the body 180, as indicated by the arrows. This air can be sufficient to support combustion, thus dispensing with ports 186 and valves 186a, if desired. The partition 181 directs air through the combustion zone before reaching the discharge.

Around the bottom half of body 180, midway of its length, there is formed a circumferentially extended hot gas discharge port 194, this port being defined by outwardly and rearwardly flared member 195, and forwardly convergent deflector member 196, the latter having half-round edge 197 facing forwardly in the apparatus below the partition 181. This edge 197 will be seen to be in position to intercept gas flow rearwardly in the apparatus, below the partition 181, and the configuration is such as to deflect this air flow outwardly and to eject it from the apparatus as indicated by the arrows.

In operation, combustion at the resonant frequency of the body 180 is established in the usual manner, with the result of the establishment of a pressure anti-node P in the nose end of the body, a pressure anti-node P' in the tail end of the body, and velocity anti-node regions V and V' midway of the length of the body, above and below partition 181. In the regions V and V', gas oscillates in a longitudinal direction as indicated by the arrows. Each time the gas flow in the velocity anti-node region V is in the direction from the nose towards the tail, air is taken in at 190, and this air is useful to either air or support combustion and to elevate the mean pressure of the system. At the same time, the gas flow in the region V' will also be in the direction from the nose towards the tail, and a portion of this gas flow is intercepted by the edge 197, and ejected from the apparatus by way of port 194. There is not much tendency for air to be ejected from port 190 with gas flow in the reverse direction, because of intake port 90 being practically flush inside.

Fig. 21 shows an embodiment wherein a long, half wave pipe 200 has a quarter wave air intake pipe 201 opening into its head end 202, and is provided with a closed end 203 at its tail. Fuel is injected at 204, and a spark plug is provided at 205.

Such a device, under pressure pulses generated at combustion zone 206, by igniting fuel charges thereat, resonates to set up a standing wave with a pressure anti-node P at the combustion region, a pressure anti-node P' at the far end, adjacent end closure 203, and a velocity anti-node V midway of the length of the pipe. At the region V the gas oscillates at maximum amplitude.

Two hot-gas discharge pipes 207 and 208 are mounted in the wall of the pipe 200 near the velocity anti-node region V, the pipe 207 having an open intake end 209 facing toward the head end of the pipe 200, and the pipe 208 having an open intake end 210 facing toward the rearward end 203 of the pipe 200. Both pipes 207 and 208 discharge in a direction generally rearwardly of the apparatus. As will be seen, the pipe 207 intercepts gas from the velocity anti-node region when the flow is in the direction from the head end toward the rearward end, and pipe 208 intercepts gas when the flow is in the reverse direction. Both pipes discharge gas from the system, and discharge takes place on both half cycles of the alternating gas flow occurring in the region V.

Fig. 22 shows still another embodiment of the invention, being a twin burner pipe form having certain resemblance to the U-tube form of Fig. 17, and having air intake provisions similar, in part, to the embodiment of Fig. 1. In general, the engine of Fig. 22 has two parallel burner pipes 220, interconnected by a tail pipe fitting 221 at one end of the apparatus, and by a U-tube, or V-tube, valveless air intake means 222 at the opposite end of the apparatus. Each burner pipe 220 has a forward combustion chamber 223, closed by forward head wall 223a, and a tapered portion joining the combustion chamber to reduced pipe section 224. The tail pipe fitting 221 has two arms flange-fitted to the rearward ends of the two pipe sections 224, and is in the general form of a Y, the two arms communicating with one another to form a continuous gas conduit connecting the rearward ends of the two pipe sections 224, and the stem forming the tail pipe outlet. Gas traveling from one of these arms to the other will be seen to make a 180° turn. The fitting 221 has a rearward opening to which is flange-fitted a reduced, rearwardly directed orifice member 226 through which products of combustion are jetted.

The air intake assembly 222 is in the general form of a U-tube or V-tube, having two leg portions 230 connected into heads 223a, and joined by a 180° return bend fitting 231, which, in the embodiment of Fig. 22, is somewhat pinched so as to reduce the radius of curvature of the bend. The two legs of fitting 231 are also preferably gradually constricted toward their forward end juncture, as shown. An air intake port 234 opens into the fitting 231 at its inner side, i. e., between its two legs, and the intake air is fed via the two legs of said fitting and the pipes 230 into the combustion chambers 223.

Fuel for combustion may be introduced into the system in various ways, but is here shown as injected by means of fuel injectors 236 mounted in rings 237 placed between the ends of the fitting 231 and the adjacent ends of the pipes 230. Thus fuel is injected into the air streams entering the pipes 230 leading into the combustion chambers 223.

Fuel so introduced into the air intake system and conveyed thence to the chambers 223 is ignited in the latter, and ignition may be initiated by means of a spark plug 240 mounted in the side wall of one of the chambers 223. Once ignition has been initiated, a flame lingering in the combustion chamber between explosions is available to burn successive fuel charges, and electric ignition is no longer required. To aid in the retention of this flame between explosions, a turbulizer and flame holder 241 is preferably employed at the head end of the combustion chamber, consisting in this instance of a small cone supported by webs 242. This cone affords a protected region wherein the flame is maintained in an attenuated state between explosions. It is found in practice that a spark plug need be used in only one of the two combustion chambers, since flame in one of the burner pipes will reach fuel in the other, and when the latter has once been exploded, flame thereafter resides in both chambers 223, and is available to set off the accumulating fuel charge whenever the pressure within the combustion chamber is sufficiently elevated by the standing wave pressure cycle therewithin for the desired explosion to occur.

Assuming air for combustion to be fed to the two combustion chambers 223 through the described air intake means, fuel to be injected into this air, and preliminary electric ignition to be provided a resonant standing wave is established in the two burner pipes similar to that described in connection with Fig. 17, and need not be again described, excepting to note that a velocity anti-node region V appears in the tail pipe fitting 221, as indicated, and pressure anti-node regions P and P' appear at the head ends of the combustion chambers 223. The combustion cycle is as in Fig. 17. The lengths of the two air intake paths from the intake port 234 to the combustion chambers 223 are of approximately one-quarter wavelength for a desired component of the resonant standing wave frequency of the twin burner pipes connected by the tail pipe fitting 221, difference in temperature of gases in the air intake pipe system and in the burner pipes being taken into account. A resonant standing wave accordingly is set up in the air intake pipe system, with a velocity anti-node appearing at V', in the general manner described in connection with Fig. 1. Gas oscillation at resonant frequency accordingly occurs about the sharp bend of the air intake pipe system, opposite the air intake port 234.

Combustion gas discharge is effected from the system through the tail pipe discharge orifice 226, aided by centrifugal force effects as explained in connection with earlier described embodiments of the invention, particularly that of Fig. 1. Air intake into the valveless air feed system 222 occurs inwardly through the air intake port 234, by reason of centrifugal force effects owing to gas oscillation at V', as described in connection with Fig. 1. It is noted, however, that the system as shown in Fig. 22 develops higher centrifugal force by reason of the radii of curvature of the 180° turns of the pipe fittings 221 and 231 having been minimized. The constriction of the pipe fitting 231 in the region of the air intake port 234 contributes an additional air pumping factor by reason of Bernoulli effect. Thus the velocity of the oscillating gases in the constricted region V' is increased, and the pressure correspondingly decreased, and this lowered internal pressure at V' improves air intake.

Fig. 22a shows a modification of the air intake system for the engine of Fig. 22, differing from the system of Fig. 22 only in that a modified air intake fitting 231a is used having a uniform cross sectional area throughout, the provision for increasing pumping by Bernoulli effect thus being dispensed with in this case. Otherwise, the system is the same as that of Fig. 22.

Fig. 22b shows a modified tail pipe fitting 221a for the engine of Fig. 22. In Fig. 22b, fragmentary rearward end portions of the pipe sections 224 of the engine of Fig. 22 are again shown, and it will be understood that the engine forwardly of the flanges at the end portions of the pipes 224 may be identical with that shown in Fig. 22.

The fitting 221a has, at the points of flange connection with the rearwards ends of pipes 224, two rearwardly extending cylindrical leg portions 250. Each of these merges or divides into two semi-cylindric portions 251 and 252, the former extending straight rearwardly and terminating in a gas discharge outlet 251a, and the latter curved through 90° to join the similarly curved member 252 of the other leg 250. Thus the rearward ends of the two burner pipes 220 are internally connected by a U-tube configuration, while outside of the latter are two straight, rearwardly directed gas discharge pipes. It will be observed that the semi-cylindric portions 251 and 252 have diametric walls 254 and 255 merging to an apex at 255a to form a gas flow divider, and that the wall portions 255 deflect or turn the gas column through 180°.

The velocity anti-node region is designated by the letter V and by the accompanying double-headed arrow, which represents the region throughout which it is particularly effective. In other words, sonic gas oscillation owing to the resonant standing wave in the system is at the necessary near-maximum throughout the extent of the gas column within the reach of the arrow. The sonically oscillating gas column is split at 255, a portion being ejected to atmosphere through the pipe 251 under velocity energy of the velocity anti-node, and a portion being deflected or turned by the wall 255 and being then retained within the closed portion of the system. The latter portion of the gas column thus oscillates within and around the 180° conduit connecting the burner pipes 220, while the former is discharged straight rearwardly. That portion which stays within and turns around the 180° conduit, as above described, and expands to fulfill most of the back-flow requirements for the opposite pipe 224, thus minimizes cyclic back-flow into stacks 251. Accordingly, outflow is more facilitated than is inflow, all due to dividing the velocity anti-node gases at the discharge.

A substantial number of exemplifications of the basic invention have now been indicated for the purpose of making clear the full range of the invention. It is to be understood, however, that no attempt has been made to be entirely exhaustive, and that numerous additional forms of the invention are possible and will occur to those skilled in the art. The invention is accordingly to be regarded as broad in nature and to be limited only in accordance with the spirit of the appended claims.

I claim:

1. A jet flow apparatus including a resonant fluid conduit, pressure pulse generating means in a portion of said conduit for creating periodic pressure pulses in the fluid in said conduit at a resonant frequency of said conduit, whereby to create resonance in said conduit with pressure anti-node conditions therein adjacent said pressure pulse generating means and velocity anti-node conditions therein, said conduit having openings in the wall thereof defining, respectively, a fluid inlet and a fluid outlet to and from said conduit, at least one of said openings communicating with the interior of said conduit adjacent a velocity anti-node, the fluid-guiding surfaces of said conduit adjacent said inlet and outlet openings having respectively different configurations and being disposed relative to the direction of fluid flow in said conduit adjacent said openings, so as to create a net pumping gradient in response to flow of fluid in said conduit over said surfaces and in the direction inwardly of said inlet and outwardly of said outlet.

2. The subject matter of claim 1, wherein the conduit has a longitudinal deflection adjacent the region of said velocity anti-node, whereby to set up in the fluid traveling therealong a centrifugal force component, and wherein said one opening is so located and disposed that said centrifugal force component induces the desired fluid flow.

3. The subject matter of claim 1, wherein there are velocity anti-nodes in said conduit in the regions of said fluid inlet and outlet openings, and wherein the conduit has a longitudinal deflection adjacent the region of each of said velocity anti-nodes, whereby to set up in the fluid traveling therealong a centrifugal force component at each of said deflections, and wherein said fluid inlet opening communicates with said conduit at a point spaced transversely of the conduit from the side thereof toward which gases are compressed by the corresponding force component, and wherein said fluid outlet opening communicates with said conduit at a point toward which gases are compressed by the corresponding centrifugal force component.

4. The subject matter of claim 1, wherein the conduit has a longitudinal deflection adjacent the region of a velocity anti-node, whereby to set up in the fluid traveling therealong a centrifugal force component, and wherein said fluid inlet opening communicates with said conduit in the region of said longitudinal deflection and at a point spaced transversely of the conduit from the side thereof toward which gases are compressed by said centrifugal force component.

5. The subject matter of claim 1, wherein the conduit has a longitudinal deflection adjacent the region of a velocity anti-node, whereby to set up in the fluid traveling therealong a centrifugal force component, and wherein said fluid outlet opening communicates with said conduit in the region of said longitudinal deflection and at a point toward which gases are compressed by the corresponding centrifugal force component.

6. The subject matter of claim 1, wherein the fluid conduit has its fluid inlet in the region of a velocity anti-node and wherein the conduit has an internal surface of concave longitudinal curvature in said region, and said fluid inlet opening communicates with said conduit at a position spaced transversely across the conduit from said region of concave longitudinal curvature.

7. The subject matter of claim 1, wherein the fluid conduit has its fluid outlet in the region of a velocity anti-node and wherein the conduit has an internal surface of concave longitudinal curvature in said region, and said fluid outlet opening communicates with said conduit at said region of concave longitudinal curvature.

8. The subject matter of claim 1, wherein there are velocity anti-nodes in said conduit in the regions of said fluid inlet and outlet openings, and a fluid guiding and deflecting wall portion of concave longitudinal curvature in said conduit at each of said velocity anti-node regions, said fluid inlet opening communicating with said conduit at a point spaced across the conduit from the corresponding wall portion of concave longitudinal curvature, and said fluid outlet opening leading from said conduit at a point adjacent the corresponding wall portion of concave longitudinal curvature.

9. The subject matter of claim 1, wherein said conduit is longitudinally rounded and has a fuel combustion zone therein, and said means for creating periodic pressure pulses comprises means for feeding fuel to said zone and periodically igniting said fuel to accomplish periodic combustion at said zone at a resonant frequency of said conduit, said periodic combustion operating to establish standing wave resonance in said conduit with a pressure anti-node at a point half a wavelength around said conduit from said first mentioned combustion zone, and velocity anti-node regions at half-way points between said pressure anti-nodes, said fluid inlet opening communicating with said longitudinally rounded conduit at the inner periphery thereof in the region of one of said velocity anti-nodes, and said fluid outlet opening leading from said conduit at the outer periphery thereof in the region of the other of said velocity anti-nodes.

10. The subject matter of claim 1, wherein the conduit has a longitudinal deflection adjacent the region of a velocity anti-node, whereby to set up in the fluid traveling therealong a centrifugal force component, and wherein said fluid inlet opening communicates with said conduit in the region of said longitudinal deflection and at a point spaced transversely of the conduit from the side thereof toward which gases are compressed by said centrifugal force component, and wherein said fluid inlet opening communicates with said conduit in the region of said longitudinal deflection and at a point spaced transversely of the conduit from the side thereof toward which gases are compressed by said centrifugal force component.

11. The subject matter of claim 1, including a fluid deflecting wall means at a velocity anti-node region of the conduit for changing the direction of at least a portion of the oscillating fluid, so as to create a pressure gradient through the fluid body inside the conduit, and said fluid inlet and outlet openings communicating with said conduit at different pressure levels of said gradient to cause a net fluid flow through said openings and the intervening portion of the conduit in response to said pressure gradient.

12. The subject matter of claim 1, wherein the fluid outlet opening is adjacent a velocity anti-node, and wherein the wall portions of the conduit in the region of said outlet opening are formed in a fluid dividing and deflecting configuration such as to divide the oscillating fluid stream in the conduit adjacent the fluid outlet opening into two divergent portions, one portion oscillating within the conduit and another portion directed outward of said fluid outlet opening, whereby to induce discharge of fluid from the conduit via said fluid outlet opening and consequent inflow of air into said conduit via said inlet opening.

13. The subject matter of claim 1, wherein the fluid outlet opening is adjacent a velocity anti-node, and wherein the conduit contains outlet fluid path defining wall means configured and oriented to intercept and laterally deflect a portion of the oscillating fluid stream in the velocity anti-node region of the conduit, said outlet fluid path defining wall means discharging to the exterior of said conduit.

14. The subject matter of claim 13, wherein said outlet fluid path defining wall means comprises a scoop port having a mouth including a fluid intercepting forward edge in said conduit in the path of a portion of the oscillatory fluid stream in said velocity anti-node region.

15. The subject matter of claim 1, wherein said conduit includes two burner conduit sections and two air intake conduit sections, said air intake conduit sections joining one another at corresponding ends at an acuate angle, and each joining an end of one of said burner conduit sections at its opposite end, said pressure pulse means including a means for creating periodic fuel combustion at the resonant frequency of the conduit in each of said burner conduit sections in a region adjacent the juncture thereof with the corresponding air intake conduit section, said air intake conduit sections being so proportioned that a velocity anti-node condition exists at the acute angled juncture thereof, and said fluid inlet opening comprising a port opening into the velocity anti-node region of air intake conduit sections from within the apex of said acuate angled juncture.

16. The subject matter of claim 1, wherein said conduit has a velocity anti-node in the region of the fluid outlet opening, and wherein said conduit has two legs leading into said velocity anti-node region, and joined by a U-bend conduit section wherein the velocity anti-node is maximized, said fluid outlet opening being divided into two parts, one for each of said legs, each defined by a fluid discharge conduit having a scoop port internally of the conduit and forming an extension of the corresponding conduit leg, adjacent the juncture of said leg with said U-bend conduit section, the oscillating fluid stream owing to said velocity anti-node being partially intercepted by said scoop ports and ejected from the system via said discharge conduits.

17. A resonant fluid conduit of substantially ring shape having a combustion zone at one point therein, means for feeding fuel to said combustion zone and for periodically igniting said fuel to accomplish periodic combustion at said zone at a resonant frequency of said conduit, said periodic combustion operating to establish standing wave resonance in said conduit with a pressure anti-node at said combustion zone, another pressure anti-node at a point half a wavelength around said conduit from said first mentioned combustion zone, and velocity anti-node regions at half-way between said pressure anti-nodes, a fluid inlet opening into said conduit into the inner periphery thereof in the region of one of said velocity anti-nodes, a fluid outlet leading from said conduit from the outer periphery thereof in the region of the other of said velocity anti-nodes, a second combustion zone at the second mentioned pressure anti-node region, and means for feeding fuel to said second combustion zone and for periodically igniting said fuel at 180° phase difference from the periodic ignition at the first mentioned combustion zone.

18. Two resonant fluid conduits of substantially ring shape, each having: a combustion zone at one point therein, means for feeding fuel to said combustion zone and for periodically igniting said fuel to accomplish periodic combustion at said zone at a resonant frequency of said conduit, said periodic combustion operating to establish standing wave resonance in said conduit with a pressure anti-node at said combustion zone, another pressure anti-node at a point half a wavelength around said conduit from said first mentioned combustion zone, and velocity anti-node regions at half-way points between said pressure anti-nodes, a fluid inlet opening into said conduit into the inner periphery thereof in the region of one of said velocity anti-nodes, and a fluid outlet leading from said conduit from the outer periphery thereof in the region of the other of said velocity anti-nodes; the fluid discharge for one of said conduits being connected into the inner peripheral region of the other of said conduits at a point near the fluid outlet of said other conduit, and the fluid inlet for said other conduit leading from an outer peripheral region of the first mentioned conduit at a point near the fluid inlet of said first mentioned conduit.

19. Two resonant fluid conduits of substantially ring shape, each having: a combustion zone at one point therein, means for feeding fuel to said combustion zone and for periodically igniting said fuel to accomplish periodic combustion at said zone at a resonant frequency of said conduit, said periodic combustion operating to establish standing wave resonance in said conduit with a pressure anti-node at said combustion zone, another pressure anti-node at a point half a wavelength around said conduit from said first mentioned combustion zone, and velocity anti-node regions at half-way points between said pressure anti-nodes, a fluid inlet opening into said conduit into the inner periphery thereof in the region of one of said velocity anti-nodes, and a fluid outlet leading from said conduit from the outer periphery thereof in the region of the other of said velocity anti-nodes; the fluid inlet for one of said conduits being connected to the fluid outlet for the other of the conduits.

References Cited in the file of this patent
UNITED STATES PATENTS 2,523,308    Kemmer et al. _____ Sept. 26, 1950

FOREIGN PATENTS 188,642    Great Britain _____ Nov. 29, 1923
533,330    Great Britain _____ Feb. 11, 1941